(12) United States Patent
Pfister et al.

(10) Patent No.: US 11,021,194 B2
(45) Date of Patent: Jun. 1, 2021

(54) AIR GUIDING ARRANGEMENT FOR A MOTOR VEHICLE

(71) Applicant: Dr. Ing. h.c. F. Porsche Aktiengesellschaft, Stuttgart (DE)

(72) Inventors: Klaus Pfister, Maulbronn (DE);
Markus Paulitsch, Ettlingen (DE);
Dimitar Danev, Renningen (DE);
Steffen Hoelzel, Eberdingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 108 days.

(21) Appl. No.: 16/375,862

(22) Filed: Apr. 5, 2019

(65) Prior Publication Data

US 2019/0315415 A1   Oct. 17, 2019

(30) Foreign Application Priority Data

Apr. 13, 2018   (DE) .................. 10 2018 108 810.8

(51) Int. Cl.
*B60R 19/34*         (2006.01)
*B62D 35/00*        (2006.01)

(52) U.S. Cl.
CPC ................................. *B62D 35/005* (2013.01)

(58) Field of Classification Search
CPC ........... D01H 4/12; F01N 13/009; A24C 5/18; A47L 7/009; B01D 46/0068; F16K 1/165; F24F 13/075; F24F 1/00; B60H 1/00007; B60H 1/00392
See application file for complete search history.

(56) References Cited

U.S. PATENT DOCUMENTS

| | | | | |
|---|---|---|---|---|
| 3,805,913 A | * | 4/1974 | Jackes ..................... | B60V 1/16 180/128 |
| 4,489,806 A | * | 12/1984 | Shimomura ......... | B62D 35/005 180/313 |
| 4,558,897 A | * | 12/1985 | Okuyama ............. | B62D 35/005 296/180.5 |
| 4,659,130 A | * | 4/1987 | Dimora ................. | B62D 35/005 296/180.1 |
| 4,976,489 A | * | 12/1990 | Lovelace .............. | B62D 35/005 296/180.1 |
| 6,035,560 A | * | 3/2000 | Pender .................... | E01H 5/066 296/180.5 |

(Continued)

FOREIGN PATENT DOCUMENTS

DE   102011111456 A1   2/2013
DE   112008002316 B4   10/2014

*Primary Examiner* — Kiran B Patel
(74) *Attorney, Agent, or Firm* — Leydig, Voit & Mayer, Ltd.

(57) ABSTRACT

An air guiding arrangement for a motor vehicle includes: a carrier arranged on a vehicle body, and on which an air guide is mounted such that the air guide is drivable from a retracted home position to an extended maximum position by a drive, a sensor arrangement that monitors the position of the air guide and is connected to a controller so as to transmit data corresponding to the position, the sensor arrangement comprising an electric field sensor arrangement to monitor the position of the air guide, at least one electromagnetic field source is provided in the air guide, and at least one electric field receiver, which is a sensor of the sensor arrangement, is provided in the carrier and/or in the vehicle body.

8 Claims, 2 Drawing Sheets

(56) References Cited

U.S. PATENT DOCUMENTS

| | | | | |
|---|---|---|---|---|
| 6,286,893 B1 * | 9/2001 | Presley | ............... | B62D 35/005 296/180.5 |
| 6,953,218 B2 * | 10/2005 | Jungert | ............... | B62D 35/005 296/180.1 |
| 7,055,891 B2 * | 6/2006 | Jungert | ............... | B62D 35/005 296/180.5 |
| 7,780,223 B2 * | 8/2010 | Kottenstette | ......... | B62D 35/005 296/180.1 |
| 8,403,401 B2 * | 3/2013 | Rinehart | ............. | B62D 35/001 296/180.3 |
| 8,562,067 B2 * | 10/2013 | Hoelzel | ............... | B62D 35/005 296/180.5 |
| 9,394,012 B2 * | 7/2016 | Reuvekamp | ......... | B62D 35/005 |
| 9,540,053 B2 * | 1/2017 | Reuvekamp | ............ | B29D 5/00 |
| 9,714,058 B2 * | 7/2017 | Fahland | ............... | B62D 35/005 |
| 9,738,328 B2 * | 8/2017 | Fahland | ............... | B62D 37/02 |
| 9,994,265 B2 * | 6/2018 | D'Arcy | ................... | G05D 3/10 |
| 10,124,839 B2 * | 11/2018 | Povinelli | ............... | B62D 37/02 |
| 10,625,791 B2 * | 4/2020 | Fahland | ............... | B62D 35/005 |
| 2003/0116996 A1 * | 6/2003 | Soja | ..................... | B62D 35/005 296/180.5 |
| 2009/0222174 A1 | 9/2009 | Frommer et al. | | |
| 2012/0292943 A1 * | 11/2012 | Danev | ................. | B62D 35/005 296/180.1 |
| 2013/0049399 A1 * | 2/2013 | Hoelzel | ............... | B62D 35/005 296/180.5 |
| 2013/0057022 A1 * | 3/2013 | Hoelzel | ............... | B62D 35/005 296/180.5 |
| 2014/0110970 A1 * | 4/2014 | Hoelzel | ............... | B62D 35/005 296/180.5 |
| 2014/0252800 A1 * | 9/2014 | D'Arcy | ............... | B62D 35/005 296/180.5 |
| 2015/0274221 A1 * | 10/2015 | Hoelzel | ............... | B62D 35/005 296/180.1 |
| 2019/0315416 A1 * | 10/2019 | Danev | ................. | B62D 35/005 |

\* cited by examiner

AIR GUIDING ARRANGEMENT FOR A MOTOR VEHICLE

CROSS-REFERENCE TO PRIOR APPLICATIONS

Priority is claimed to German Patent Application No. DE 10 2018 108 810.8, filed on Apr. 13, 2018, the entire disclosure of which is hereby incorporated by reference herein.

FIELD

The invention relates to an air guiding arrangement for a motor vehicle.

BACKGROUND

An air guiding arrangement of the generic type is known from DE 10 2011 111 456 A1. In order to be able to monitor the position of the air guiding element and possibly to be able to match the position of the air guiding element to changed boundary conditions, in particular speed, a sensor arrangement is provided here, which sensor arrangement monitors the position of the air guiding element and is connected to a control device so as to transmit data. The sensor arrangement consists of a magnet which is operatively connected to a bar which is guided in the air guiding element and is moved by said bar. An inductive sensor is provided in the region of the magnet, which inductive sensor detects the positions of the magnet. Therefore, detection of the position of the air guiding element takes place indirectly, as a result of which corruption of the measurement results is possible. Furthermore, the design of the sensor arrangement is complicated and expensive.

SUMMARY

An embodiment of the present invention provides an air guiding arrangement for a motor vehicle that includes: a carrier arranged on a vehicle body, and on which an air guide is mounted such that the air guide is drivable from a retracted home position to an extended maximum position by a drive, a sensor arrangement that monitors the position of the air guide and is connected to a controller so as to transmit data corresponding to the position, the sensor arrangement having an electric field sensor arrangement to monitor the position of the air guide, at least one electromagnetic field source is provided in the air guide, and at least one electric field receiver, which is a sensor of the sensor arrangement, is provided in the carrier and/or in the vehicle body.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention relate to an air guiding arrangement for a motor vehicle, which includes a carrier part that is arranged on a vehicle body part and on which an air guiding element is mounted such that it can be driven from a retracted home position as far as an extended maximum position by a drive arrangement. A sensor arrangement can be provided, which sensor arrangement monitors the position of the air guiding element and is connected to a control device so as to transmit data.

Embodiments of the present invention avoid the above-mentioned disadvantages in a simple and cost-effective manner.

Embodiments of the present invention provide a sensor arrangement that is designed as an electric field sensor arrangement. At least one electromagnetic field source is provided in the air guiding element (air guide), and at least one electric field receiver, which is designed as a sensor, is provided in the carrier part and/or in the vehicle body part. As a result, it is possible to directly detect a change in position of the air guiding element in a simple manner. Furthermore, the design as an electric field sensor arrangement allows for simple design of the sensor arrangement in respect of the air guiding arrangement.

The electric field receiver is particularly advantageously designed as a deep plex sensor.

In an advantageous embodiment, the air guiding element can be designed as a front spoiler lip.

The electromagnetic field source is advantageously designed as a wire body to which current is applied. During use in the case of the air guiding element being designed as a front spoiler lip, the wire body can then be designed as a spring wire, which directly or indirectly connects the front spoiler lip to the carrier part. Here, it is particularly advantageous when three sensors are provided on the carrier part.

The drive arrangement is particularly advantageously designed as a pneumatic drive arrangement.

Figure 1:
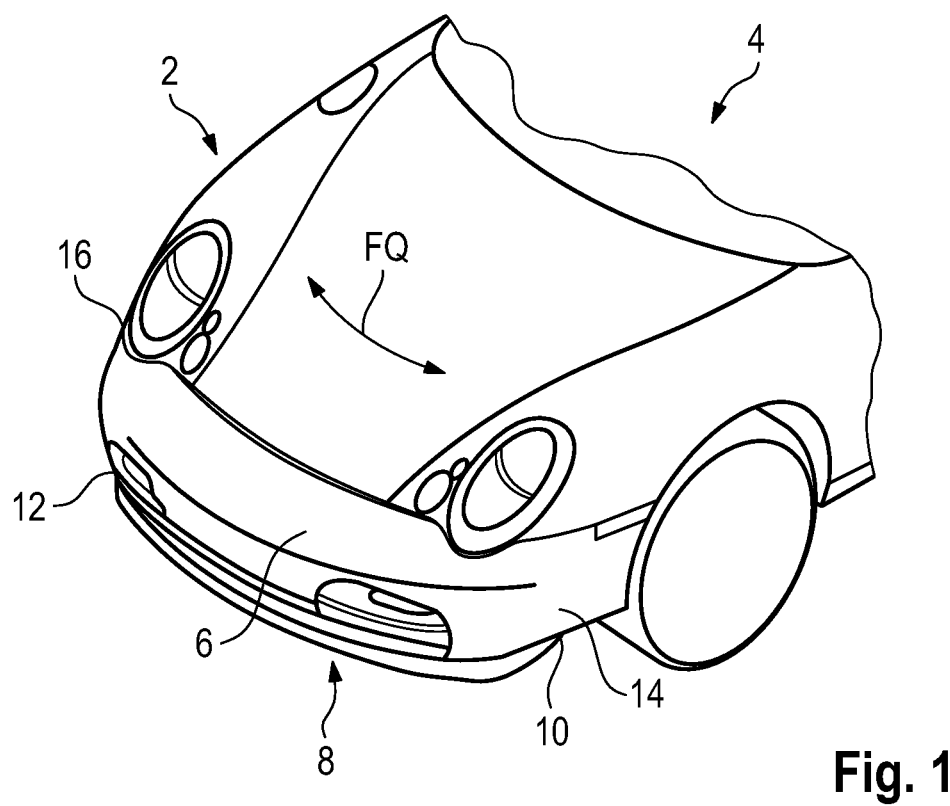
FIG. 1 shows a perspective view of a front region of a motor vehicle.

FIG. 1 shows a front section 2 of a motor vehicle 4. The front section 2 has a front apron 6, on which an air guiding arrangement 8 is provided for the purpose of optimizing handling, in particular at high speeds. Here, the air guiding arrangement 8 extends in the vehicle transverse direction FQ and ends, by way of its free ends 10, 12, at longitudinal sections 14, 16 of the front apron 6.

Figure 2:
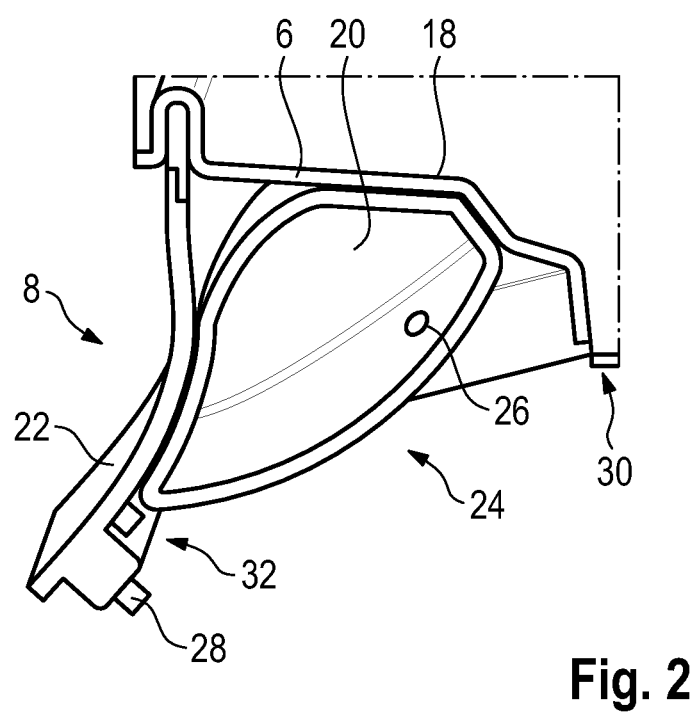
FIG. 2 shows a sectional view of an air guiding arrangement which is arranged in the front region of the motor vehicle according to FIG. 1.

FIG. 2 shows a sectional view in the region of the air guiding arrangement 8 of FIG. 1. A carrier part 18 of the air guiding arrangement 8 is provided on the front apron 6. An air chamber 20 is arranged on this carrier part 18, which air chamber moves an air guiding element 22 from a retracted home position as far as an extended maximum position. The maximum position is illustrated in FIG. 2. The number of air chambers 20 is arbitrary. Embodiments of the present invention prevent unintentional release of the air guiding arrangement 8—and therefore prevent unintentional deployment of the air chamber 20, which is part of a pneumatic drive arrangement 24, of which furthermore a connection body 26 for the supply of air is illustrated. In order to prevent the air guiding element 22 being unintentionally released in the retracted state, magnetic elements 28, 30 are provided, which magnetic elements ensure secure fixing of the air guiding element 22 on the carrier part 18.

In order to now be able to reliably monitor the positions of the air guiding element 22 in each position, a sensor arrangement 32 is provided, which sensor arrangement will be explained in more detail with reference to FIGS. 3 and 4.

Figure 3:
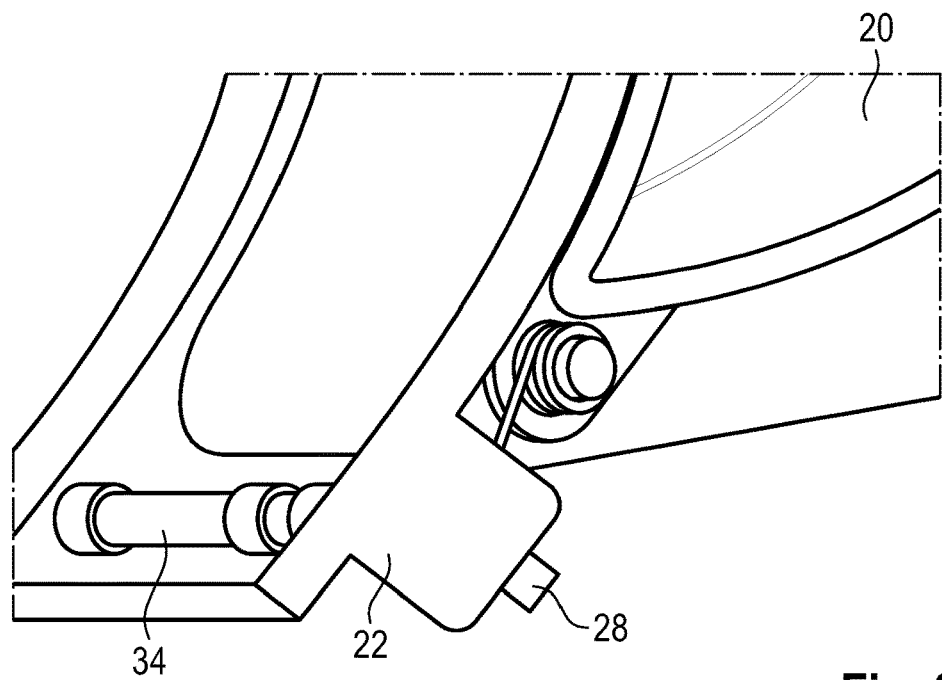
FIG. 3 shows a view of a detail of an air guiding element of the air guiding arrangement according to FIG. 2.

FIG. 3 shows a perspective view of the opened air guiding element 22. The sensor arrangement 32 is designed as an electric field sensor arrangement, wherein an electromagnetic field source, which is designed as a wire body 34 to which current is applied, is provided in the air guiding element 22. Here, the wire body 34 is already present in the air guiding arrangement 8 as a component since, in the present exemplary embodiment, it indirectly connects the front spoiler lip 22 to the carrier part 18 via the air chamber 20. Therefore, there is no need to provide an additional component as the field source 34. It is only necessary to apply current to the wire body 34 which is already present in the air guiding arrangement 8 as a component.

Figure 4:
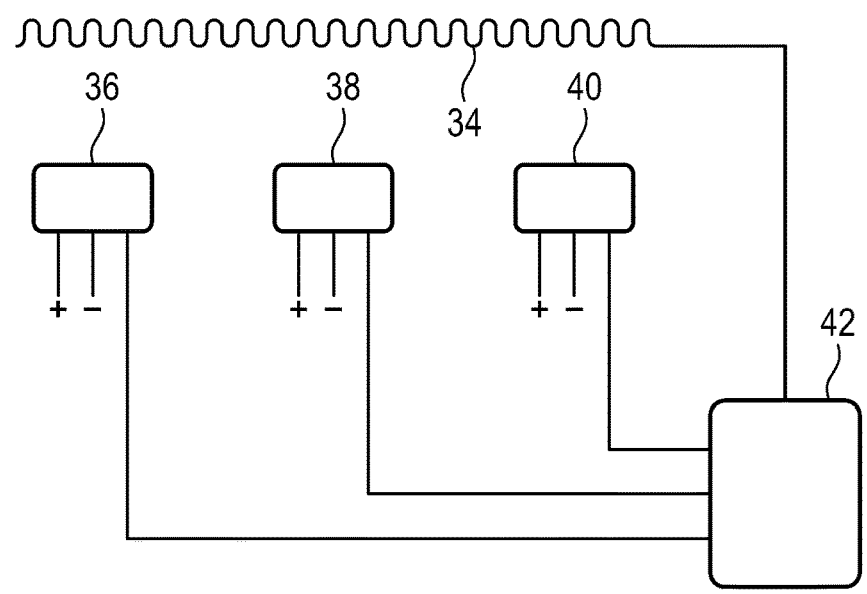
FIG. 4 shows a schematic view of a sensor arrangement of the air guiding arrangement from FIG. 2.

As is clear from the schematic illustration of FIG. 4, three deep plex sensors 36, 38, 40 are provided on the carrier part 18 in the present exemplary embodiment, which deep plex sensors serve as electric field receivers and are connected to a control device 42 so as to transmit data. In the present exemplary embodiment, the control device 42 also ensures the application of current to the wire body 34. On account of a change in position of the air guiding element 22, the electric field which is emitted by the wire body 34 changes with respect to the three sensors 36, 38, 40. This change in the electric field is measured and allows very accurate monitoring of the position of the air guiding element 22.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An air guiding arrangement for a motor vehicle, the air guiding arrangement comprising:
    a carrier arranged on a vehicle body, and on which an air guide is mounted such that the air guide is drivable from a retracted home position to an extended maximum position by a drive,
    a sensor arrangement that monitors the position of the air guide and is connected to a controller so as to transmit data corresponding to the position, the sensor arrangement comprising an electric field sensor arrangement to monitor the position of the air guide,
    at least one electromagnetic field source is provided in the air guide, and at least one electric field receiver, which is a sensor of the sensor arrangement, is provided in the carrier and/or in the vehicle body,
    wherein the electromagnetic field source is a wire body configured to receive a current, and
    wherein the wire body is a spring wire, which directly or indirectly connects the front spoiler lip to the carrier.

2. The air guiding arrangement as claimed in claim 1, wherein the electric field receiver is a deep plex sensor.

3. The air guiding arrangement as claimed in claim 1, wherein the air guide is a front spoiler lip.

4. The air guiding arrangement as claimed in claim 1, wherein the sensor arrangement comprises three sensors that are provided on the carrier part.

5. The air guiding arrangement as claimed in claim 1, wherein the drive is a pneumatic drive.

6. The air guiding arrangement as claimed in claim 1, wherein the spring wire is operatively coupled to a control device, the controller being configured to apply the current to the spring wire, the spring wire configured to generate an electromagnetic field based upon receiving the current.

7. The air guiding arrangement as claimed in claim 1, wherein the sensor is configured to detect the electromagnetic field emitted by the spring wire, wherein the sensor is operatively coupled to the controller, and wherein the sensor is configured to transmit the data corresponding to the position based upon the detected electromagnetic field.

8. The air guiding arrangement as claimed in claim 3, wherein the spring wire connects indirectly the front spoiler lip to the carrier via an air chamber.

* * * * *